United States Patent
Emina

(10) Patent No.: US 6,769,148 B1
(45) Date of Patent: Aug. 3, 2004

(54) SHOE REGRIPPER/THE GRIP TRIP

(76) Inventor: Daniel Emina, 8570 Lake Knoll Ave., #G, Garden Grove, CA (US) 92844

( * ) Notice: Subject to any disclaimer, the term of this patent is extended or adjusted under 35 U.S.C. 154(b) by 94 days.

(21) Appl. No.: 10/277,243

(22) Filed: Oct. 22, 2002

(51) Int. Cl.⁷ .................... A43D 89/00; A43D 35/00
(52) U.S. Cl. .................. 12/142 Q; 12/17 R; 12/33.2; 12/146 B
(58) Field of Search ................. 12/33.2, 33.6, 12/146 B, 146 BR, 142 E, 142 Q, 17 R

(56) References Cited

U.S. PATENT DOCUMENTS

| | | | | |
|---|---|---|---|---|
| 2,039,868 A | * | 5/1936 | Zukowski | 12/33.2 |
| 2,489,643 A | * | 11/1949 | Hunter | 12/33.2 |
| 2,659,094 A | * | 11/1953 | Walls | 12/33.2 |
| 2,724,676 A | * | 11/1955 | Randall et al. | 12/142 E |
| 2,987,738 A | * | 6/1961 | Novotny et al. | 12/33.2 |
| 3,102,286 A | * | 9/1963 | Minick | 12/33.2 |

* cited by examiner

Primary Examiner—Anthony D. Stashick
(74) Attorney, Agent, or Firm—Matthew J. Peirce

(57) ABSTRACT

An apparatus for use by individual to repair and replace tread on the bottom of a pair of shoes is disclosed. The apparatus would have a heating grid attached to the top of the base, with the heating grid including a pair of grids for placement of a pair of shoes. The apparatus would further have a pair of front clamps and a pair of rear clamps for fixing the shoes in place once they have been placed on top of the grids. The apparatus would derive power from standard household current and would have an on/off switch and a plurality of gauges to measure temperature and downward pressure placed upon the shoes.

4 Claims, 1 Drawing Sheet

SHOE REGRIPPER/THE GRIP TRIP

I. BACKGROUND OF THE INVENTION

The present invention concerns that of a new and improved apparatus for use by individual to repair and replace tread on the bottom of a pair of shoes.

II. DESCRIPTION OF THE PRIOR ART

U.S. Pat. No. 3,102,286, issued to Minick, discloses a device for treating the soles of footwear.

U.S. Pat. No. 2,987,738, issued to Novotny, discloses a device for treating the soles of footwear.

U.S. Pat. No. 2,659,094, issued to Walls, discloses a portable device for attaching a resilient rubber tread to the worn bottom surface of an article of footwear using a heating element and adjustable screws to provide pressure.

U.S. Pat. No. 2,489,643, issued to Hunter, discloses an apparatus for applying both heat and pressure for the vulcanization of footwear.

III. SUMMARY OF THE INVENTION

The present invention concerns that of a new and improved apparatus for use by individual to repair and replace tread on the bottom of a pair of shoes. The apparatus would have a heating grid attached to the top of the base, with the heating grid including a pair of grids for placement of a pair of shoes. The apparatus would further have a pair of front clamps and a pair of rear clamps for fixing the shoes in place once they have been placed on top of the grids. The apparatus would derive power from standard household current and would have an on/off switch and a plurality of gauges to measure temperature and downward pressure placed upon the shoes.

There has thus been outlined, rather broadly, the more important features of a shoe repair apparatus that the detailed description thereof that follows may be better understood and in order that the present contribution to the art may be better appreciated. There are, of course, additional features of the shoe repair apparatus that will be described hereinafter and which will form the subject matter of the claims appended hereto.

In this respect, before explaining at least one embodiment of the shoe repair apparatus in detail, it is to be understood that the shoe repair apparatus is not limited in its application to the details of construction and to the arrangements of the components set forth in the following description or illustrated in the drawings. The shoe repair apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present shoe repair apparatus. It is important, therefore, that the claims be regarded as including such equivalent constructions insofar as they do not depart from the spirit and scope of the present invention.

It is therefore an object of the present invention to provide a shoe repair apparatus which has all of the advantages of the prior art and none of the disadvantages.

It is another object of the present invention to provide a shoe repair apparatus which may be easily and efficiently manufactured and marketed.

It is another object of the present invention to provide a shoe repair apparatus which is of durable and reliable construction.

It is yet another object of the present invention to provide a shoe repair apparatus which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Priority is hereby claimed to application 60/325,822, filed on Oct. 1, 2001.

Figure 1:
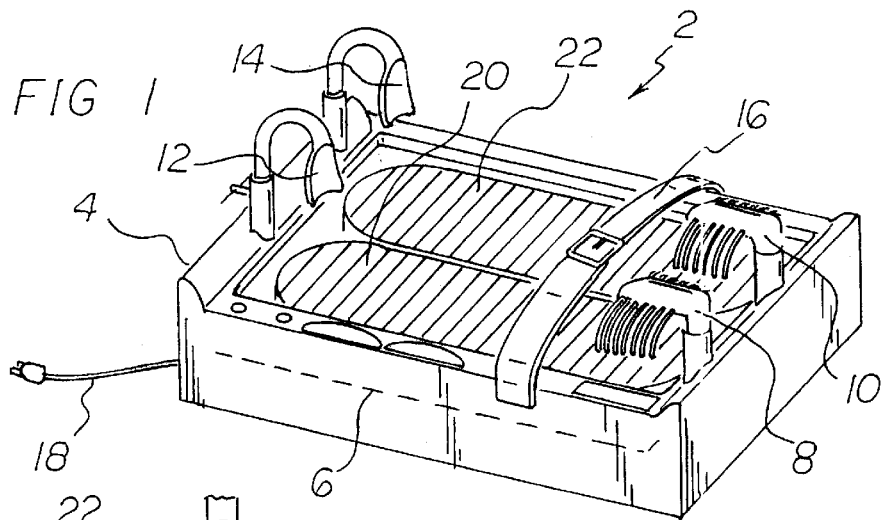
FIG. 1 shows a perspective view of the present invention.
Figure 2:
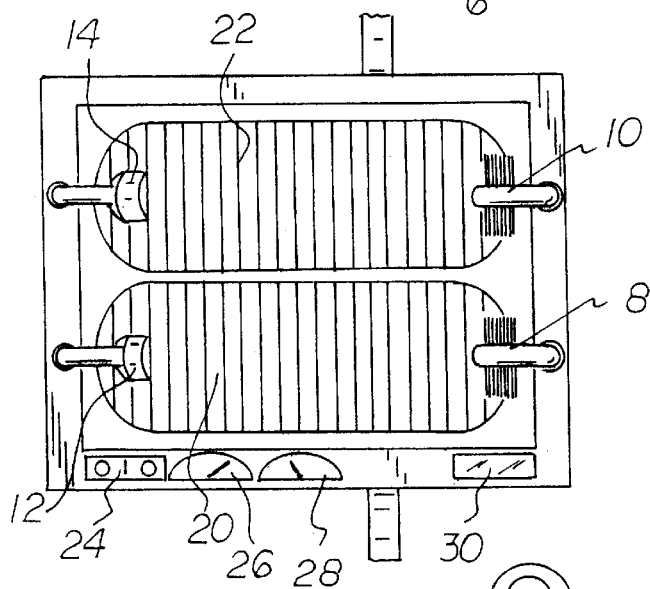
FIG. 2 shows a top view of the present invention.

FIGS. 1 and 2 show perspective and top views, respectively, of the present invention. Regripper 2 would comprise a base 4, a heating element 6, front clamps 8 and 10, rear clamps 12 and 14, and strap 16. The bottom of base 4 would be flat, allowing base 4 to be placed on a floor, table surface, or other flat surface.

Heating element 6 would fit snugly on top of base 4 and would be powered by power means through electrical cord 18, with the power means preferably being standard household current. Heating element 6 would include grids 20 and 22, which would be shaped in the approximate shape of the bottom of a shoe. Each grid would be an oval shape and grids 20 and 22 would be placed immediately adjacent to one another. Grids 20 and 22 would heat up substantially when electrical cord 18 would be hooked up and the regripper 2 would be in an "on" position. Grids 20 and 22 would each be a criss-cross pattern of wires and imprints designed to "remold" the bottom of an athletic shoe which has had the tread worn down.

Base 4 would have two end edges, a first end edge and a second end edge, and two side edges, a first side edge and a second side edge. Base 4 would also have two surfaces comprising a top surface and a bottom surface. On the first end edge would be located front clamps 8 and 10, which would be designed to be pressed downward on a pair of shoes after they had placed on grids 20 and 22, respectively. The pair of shoes, when being placed on grids 20 and 22, would be oriented so that the front portion of each shoe would be directly underneath front clamps 8 and 10. Front clamps 8 and 10 would each be capable of being temporarily locked in at a particular height. Once the pair of shoes would be placed on grids 20 and 22, then the front clamps 8 and 10 could be lowered to the point where they would place substantial downward pressure on the front portion of each shoe in the pair of shoes. Then, the front clamps 8 and 10 could be locked into that particular height.

The second end edge would include rear clamps 12 and 14, which would be designed to be pressed downward on a pair of shoes after they had placed on grids 20 and 22, respectively. The pair of shoes, when being placed on grids 20 and 22, would be oriented so that the rear portion of each shoe would be directly underneath rear clamps 12 and 14.

Rear clamps 12 and 14 would each be capable of being temporarily locked in at a particular height. Once the pair of shoes would be placed on grids 20 and 22, then the rear clamps 12 and 14 could be lowered to the point where they would place substantial downward pressure on the rear portion of each shoe in the pair of shoes. Then, the rear clamps 12 and 14 could be locked into that particular height.

Strap 16 would be used to provide additional downward pressure on a pair of shoes placed on top of grids 20 and 22. Strap 16 would have two ends, a first end and a second end, with the first end of the strap 16 being attached to the first side edge of the regripper 2 and the second end of strap 16 being attached to the second side edge of the regripper 2.

In addition, the first side edge of regripper 2 would include an on/off switch 24, a pressure gauge 26, a temperature gauge 28, and a stopwatch 30. On/off switch 24 would allow a user to turn the power to the present invention on and off, even if the electrical cord 18 would be plugged in. The temperature gauge 28 would allow a user to see the temperature of the grids 20 and 22 anytime, especially after the present invention was on. The pressure gauge 26 would let a user know the degree of downward pressure being placed on the pair of shoes. The stopwatch 30 would allow a user to keep track of the amount of time in which to pace a pair of shoes on grids 20 and 22, letting the user know at any particular time how much time is remaining for a particular pair of shoes on grids 20 and 22.

Once the pair of front clamps, the pair of rear clamps, and the strap 16 would be set, then a user would turn on/off switch 24 to an "on" position and would plug in electrical cord 18. Then, a user would set stopwatch 30 to the amount of time he desired the present invention to operate. Grids 20 and 22 would heat up, thereby partially or totally treating the rubber on the soles of the pair of shoes and restoring each shoe to the grip strength of a new shoe. In performing this process, the appearance of the shoe may change because new grooves and lines would be formed on the bottom of the shoe.

Figure 3:
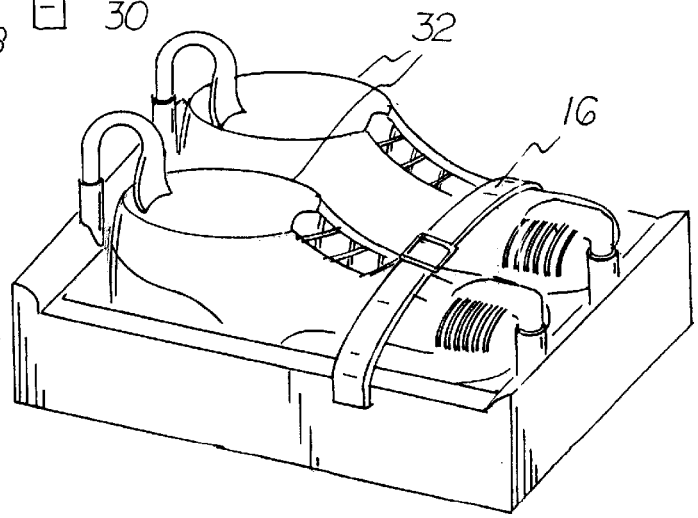
FIG. 3 shows a perspective view of the present invention in combination with a pair of shoes.

FIG. 3 shows a perspective views of the present invention in combination with a pair of shoes 32. The downward pressure upon the pair of shoes caused by the pair of front clamps, the pair of rear clamps, and the strap 16, combined with the temperature of the grids 20 and 22, would help a user restore the gripping capabilities of the rubber on the bottom of a user's pair of athletic shoes.

What I claim as my invention is:

1. An apparatus to repair and replace tread on the bottom of a pair of shoes comprising:

(a) a base having two end edges, a first end edge and a second end edge, the base also having two side edges, a first side edge and a second side edge, and two surfaces, a top surface and a bottom surface, (b) a heating element attached to the top surface of the base, (c) a pair of front clamps comprising a first front clamp and a second front clamp, each of the front clamps attached to the first end edge of the base, (d) a pair of rear clamps comprising a first rear clamp and a second rear clamp, each of the rear clamps attached to the second end edge of the base, (e) a strap having two ends, a first end and a second end, the first end of the strap attached to the first side edge of the base and the second end of strap being attached to the second side edge of the base, (f) power means for providing power to the apparatus, (g) an on/off switch located on the first side edge of the base, the on/off switch having two positions comprising an "on" position and an "off" position, (h) a stopwatch located on the first side edge of the base, (i) a plurality of gauges attached to a side edge of the base, (j) wherein a pair of shoes would be placed sole-side down onto the top of the heating element and held in place with the pair of front clamps, the pair of rear clamps, and the strap, further wherein the on/off switch would be turned to on, and further wherein the power means would be enabled.

2. An apparatus to repair and replace tread on the bottom of a pair of shoes according to claim 1 wherein the power means would comprise standard household current.

3. An apparatus to repair and replace tread on the bottom of a pair of shoes according to claim 1 wherein the heating element further comprises a pair of grids, each grid shaped like the bottom of an item of footwear.

4. An apparatus to repair and replace tread on the bottom of a pair of shoes according to claim 3 wherein the plurality of gauges attached to a side edge of the base further comprises (a) a temperature gauge for measuring the temperature of the heating element, and (b) a pressure gauge to measure the downward pressure exerted by a pair of shoes placed on the heating element.

\* \* \* \* \*